(No Model.)
4 Sheets—Sheet 1.
A. J. UPHAM.
MACHINE FOR MAKING BARBED FENCE WIRE.
No. 295,134. Patented Mar. 11, 1884.
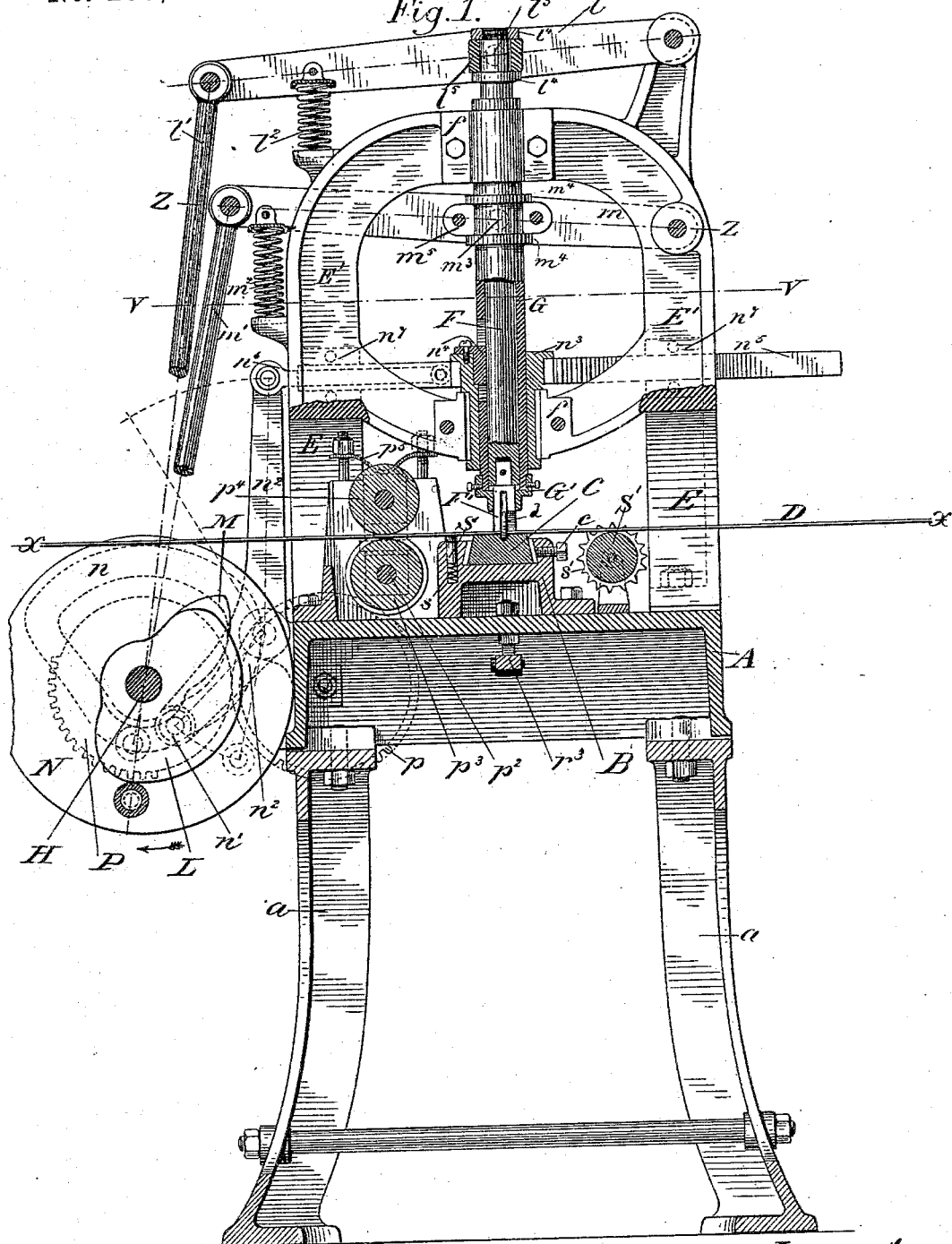
Witnesses:
L. Holmboe
W. C. Corliss
Inventor:
Andrew J. Upham,
By Geo. R. Cutler,
Attorney.

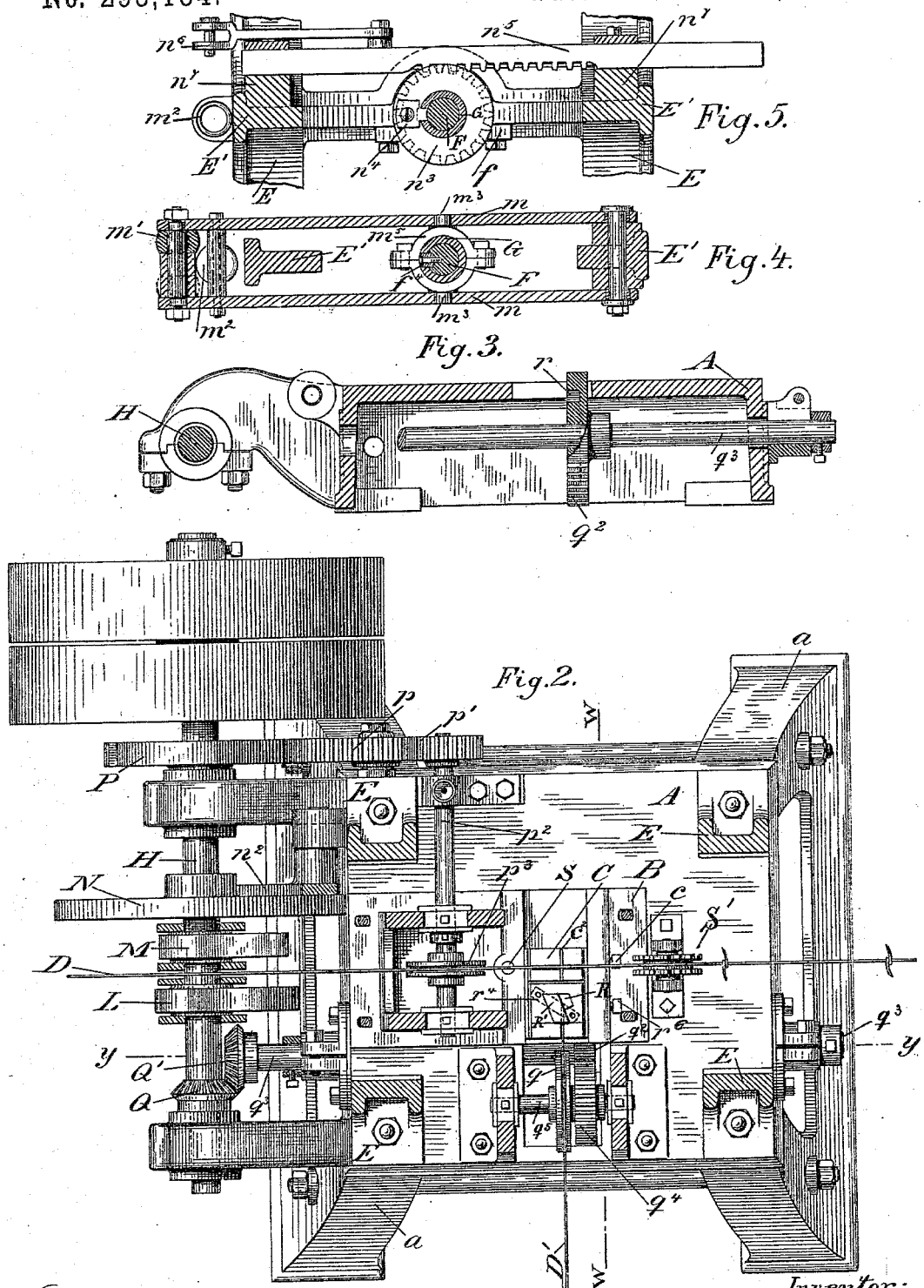

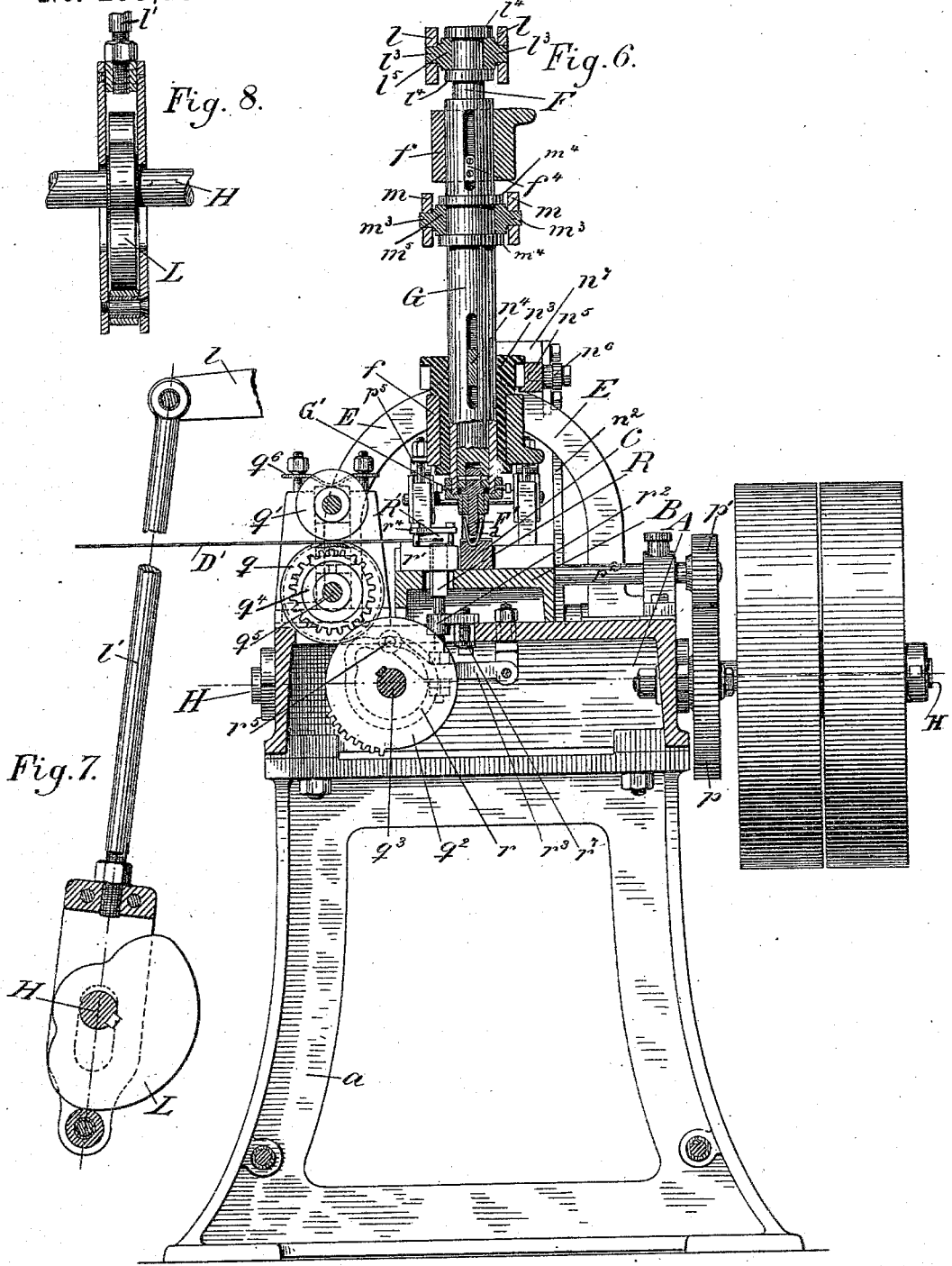

(No Model.) 4 Sheets—Sheet 4.
A. J. UPHAM.
MACHINE FOR MAKING BARBED FENCE WIRE.
No. 295,134. Patented Mar. 11, 1884.
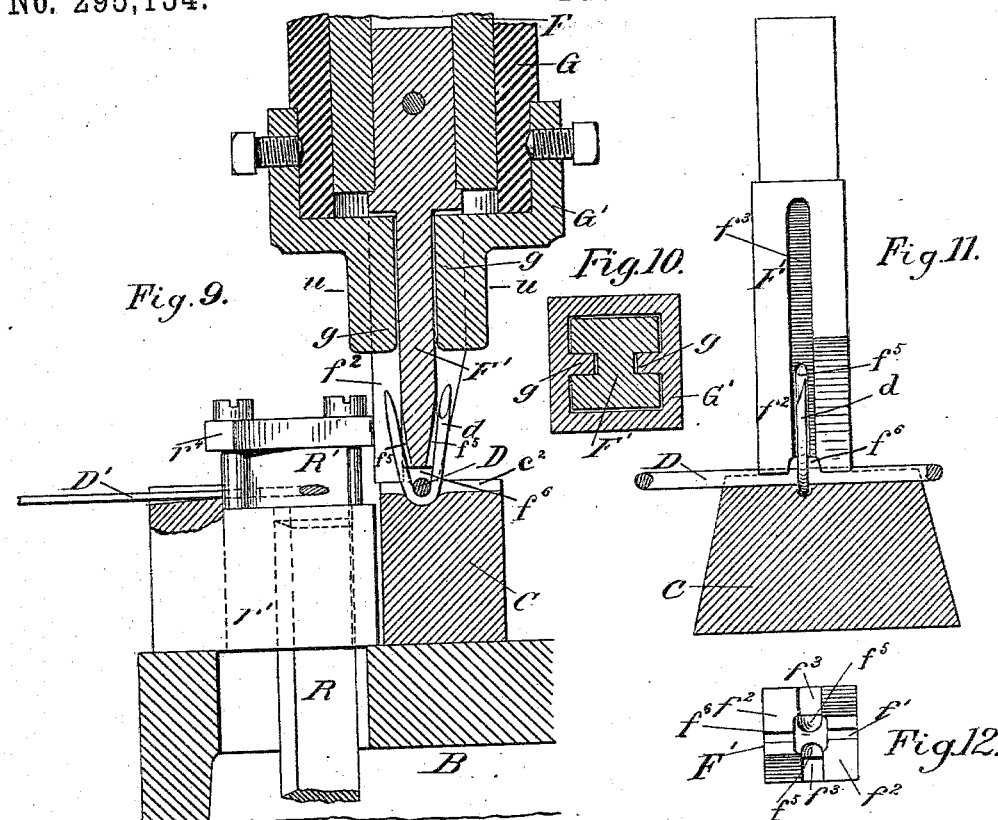
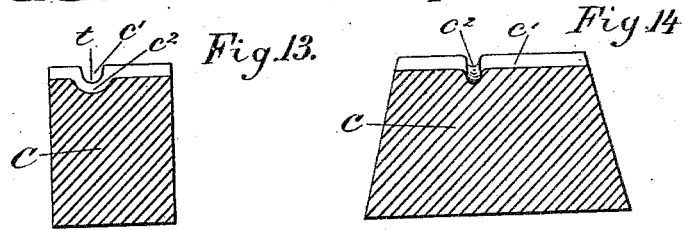
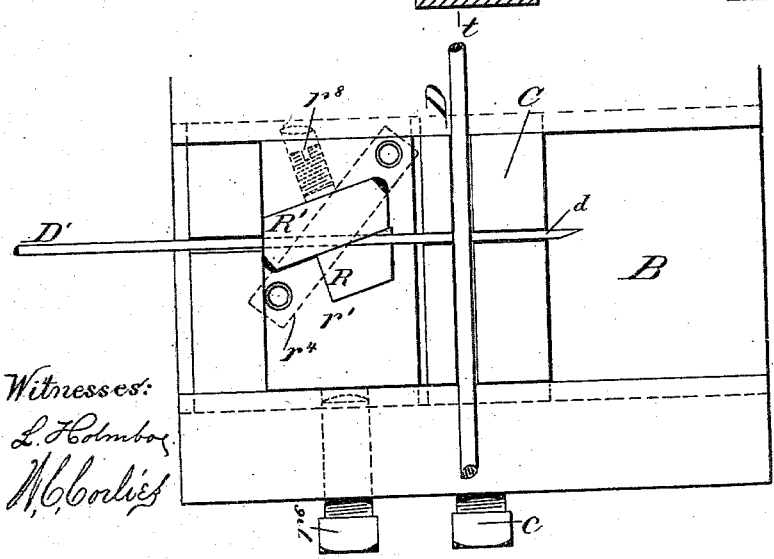
Witnesses:
L. Holmboe
N. C. Corliss
Inventor:
Andrew J. Upham,
By Geo. R. Cutler,
Attorney

UNITED STATES PATENT OFFICE.

ANDREW J. UPHAM, OF SYCAMORE, ILLINOIS, ASSIGNOR TO THE WASHBURN & MOEN MANUFACTURING COMPANY, OF WORCESTER, MASSACHUSETTS, AND ISAAC L. ELLWOOD, OF DE KALB, ILLINOIS.

MACHINE FOR MAKING BARBED FENCE-WIRE.

SPECIFICATION forming part of Letters Patent No. 295,134, dated March 11, 1884.

Application filed November 7, 1883. (No model.)

*To all whom it may concern:*

Be it known that I, ANDREW J. UPHAM, a citizen of the United States, residing at Sycamore, in the county of De Kalb and State of Illinois, have invented a certain new and useful Improvement in Machines for Making Barbed Fence-Wire, of which the following is a specification, reference being made to the accompanying drawings, in which—

Figure 1 is a sectional view of a machine embodying my improvement, the section being taken mostly on the line of the strand-wire, but so as to show all the cams of the driving-shaft. Fig. 2 is a plan section on the line $x\ x$ of Fig. 1. Fig. 3 is a detail sectional view of the main bed-plate on the line $y\ y$ of Fig. 2. Fig. 4 is a detail section of one of the levers, taken on the line $z\ z$ of Fig. 1. Fig. 5 is a detail section taken on the line $v\ v$ of Fig. 1, showing the rack and pinion. Fig. 6 is a vertical cross-section taken on the line $w\ w$ of Fig. 2. Fig. 7 is a detail view, partly in section, of the connecting-rod operating the actuating-lever of the barb-forming die and of the driving-cam of said connecting-rod. Fig. 8 is a cross-section of the lower portion of the same. Fig. 9 is a detail vertical section of the barb-forming dies, finishing-die, and barb-severing shears on an enlarged scale. Fig. 10 is a horizontal cross-section of the same, taken on the line $u\ u$ of Fig. 9, showing in detail the form of the finishing-die. Fig. 11 is an edge elevation of the upper barb-forming die and a vertical section of the lower barb-forming die on an enlarged scale. Fig. 12 is a bottom plan view of the same. Fig. 13 is a detail sectional view, on an enlarged scale, of the lower die. Fig. 14 is a cross-section of Fig. 13 on the line $t\ t$. Fig. 15 is a detail plan view, on an enlarged scale, of the lower die and shears, showing also the strand and barb wires. Fig. 16 is a detail cross-section of the finished barbed wire on an enlarged scale.

My invention relates to that class of machines for making barbed fence-wire in which the barb is coiled around the wire by means of dies.

The drawings represent a convenient mode of embodying my invention. Accordingly, and for the purpose of enabling others skilled in the art to which my invention relates to practice the same, I will first fully describe these drawings and point out the mode of operation of the machine they represent. A definite statement of the construction in which the invention consists will then be more readily understood, and will accordingly be deferred until after such description.

In the accompanying drawings, then, A represents the bed-plate of the machine, mounted on suitable legs, $a$. Upon the main bed-plate A is secured a secondary bed-plate, B, in which the lower or stationary die, C, is secured by means of a set-screw, $c$. This lower die, C, is provided with a groove, $c'$, for the strand-wire D, and also with an underlying and intersecting groove, $c^2$, for the barb-wire D'. From the bed-plate A rise semicircular standards E, upon the tops of which rests the standard E', in which latter standard are placed the bearings $f$ of the shafts F and G of the movable dies F' and G'. The die F' is provided in its face with a shallow groove, $f'$, corresponding to the groove $c'$, which groove $f'$ fits around the strand-wire and steadies it during the descent of the die F'. By mechanism hereinafter described, the die F' is forced down upon the strand-wire D, which itself forces the barb $d$ (already cut off from the barb-wire to the proper length) into the depressed part of the groove $c^2$, thus bending up each end of the barb, as clearly shown in Fig. 9, into the shallow grooves $f^5$. After the barb $d$ has been bent into this form, the die F' is caused to rotate, (in the horizontal plane,) thus coiling the barb-prongs over the strand-wire D by means of its wings $f^2$, which are on opposite sides both of the strand-wire D and of the bent-up barb $d$, (see Figs. 9, 11, and 12,) the groove $f^6$ being provided in the under surface of the die F' to allow of the presence, after coiling, of both barb-prongs under the die F' when at its lowest position. After this operation, and before the die F' is removed upward, the internal lugs, $g$, of the die G'—working vertically in grooves $f^3$ (see Figs. 11 and 12) on opposite sides of the die F'—descend upon the barb-prongs near the strand-wire, so as to tighten the barb, leaving it in the form shown in Fig. 16.

The mechanism by which the above operations are accomplished in the machine illustrated is as follows:

H is the main shaft of the machine. On this main shaft is keyed the cam L, which at intervals pulls down the shaft F of the die F' by means of the lever $l$ and connecting-rod $l'$, the lever $l$ being normally supported by a spring, $l^2$. The cam M, lever $m$, connecting-rod $m'$, and spring $m^2$ act similarly with relation to the shaft G—which is concentric with but outside of the shaft F—the connections of the cams L and M being substantially alike in mechanical detail, the rods $l'$ and $m'$ being secured to the levers above at one side of the centers of the latter, so as to be directly over their respective driving-cams. The bearings in the levers $l$ and $m$, in which the shaft-supporting pivots $l^3$ and $m^3$ are themselves supported, are of course slightly elongated (in the direction of the length of the levers) from a perfectly circular form, in order to allow of the vertical play of the shafts F and G without binding in their bearings, and the shafts F and G are respectively connected with their levers $l$ and $m$ by means of annular collars $l^5$ and $m^5$, (distinct from said shafts,) the lugs $l^3$ and $m^3$ of which form the pivots by means of which said levers operate said shafts, these collars $l^5$ and $m^5$ embracing, respectively, the shafts F and G between their respective pairs of annular shoulders $l^4$ and $m^4$, thus allowing of the free rotation of the shafts F and G by the rack, presently to be described.

On the main shaft H is also keyed a wheel, N, having a cam-groove, $n$, milled in its side, in which groove $n$ a roller, $n'$, on one end of a rocking lever, $n^2$, travels. The wheel N, by virtue of its groove $n$, rotates the shaft G—a half-revolution alternately backward and forward—through the pinion $n^3$, secured to the shaft G by the spline $n^4$, the rack $n^5$, the connecting-rod $n^6$, and the other end of the lever $n^2$, the shaft G rotating the shaft F and its die F' by means of the spline $f^4$, secured to the shaft F. This rack is supported in suitable bearings, $n^7$.

The devices for feeding and cutting the wires and for discharging them from the lower die remain to be described.

P is a cog-wheel keyed to the main shaft H, and provided with teeth over only a part of its periphery. This mutilated gear-wheel P drives a pinion, $p$, which in turn drives another cog-wheel, $p'$, both the latter wheels having their complement of teeth, and the latter being keyed to a shaft, $p^2$, on which is keyed a feed-roller, $p^3$, which, with its counterpart roller $p^4$, rotated by the friction of the roller $p^3$, feeds the strand-wire D to the dies.

Q is a bevel-gear wheel keyed to the main shaft H, which wheel drives the similarly-operating feed-rollers $q\ q'$ of the barb-wire D'. this being accomplished through the counterpart bevel-gear Q' and the mutilated gear $q^2$, both of which are keyed to the shaft $q^3$, and the pinion $q^4$, keyed to the shaft $q^5$ of the roller $q$. The wheel $q^2$ acts not only as a mutilated gear to intermittently feed the barb-wire, but is also provided with a cam-groove, $r$, for operating the movable shear or knife R at proper intervals, so as to cut the barb-wire into barbs. The knife R has a long shank set vertically in guiding-bearings $r'\ r^2$, and operated by a lever, $r^3$, the vibrating end of which is provided with a pin, $r^5$, riding in the cam-groove $r$. The knife R has a stationary counterpart, R', held down by a clip, $r^4$, and provided with an eye, closely sheathing the barb-wire, to admit it to and hold it against the shearing action of the knife R, the set-screw $r^8$ (see Fig. 15) holding the shears R R' against each other. As is clearly shown in Fig. 15, the shears R R' are set so as to cut the barb-wire obliquely, thus cutting and pointing the barbs at the same operation. The groove $c^2$ on either side of its depressed part—with the aid of the descending die F'—keeps the barb from being thrown out of place by the shears. The vertical plunger S, normally held up slightly above the face of the die C by a spring, $s$, and guided by the sides of its counterpart recess in the secondary bed-plate B, throws the finished barb barely out from the lower die, C, as soon as the upper dies, F' and G', rise upward, thus leaving the strand-wire D free to be drawn forward by its feed-rollers. The feed-rollers $p^4$ and $q'$ are held down upon their respective wires with the requisite pressure by means of the springs $p^5$ and $q^6$, respectively, which press down upon the bearings of their respective rollers.

As to details of the construction illustrated, attention may be called to the fact that the bearings of the shears may be made adjustable toward or from the die C—the bearing $r'$ by means of the set-screw $r^6$, and the bearing $r^2$ by means of the set-nut $r^7$—suitable slots being made in the bed-plates A and B and in the lever $r^3$, to allow of the free passage of the shank of the knife R. This shank is secured in the slot in the lever $r^3$ somewhat loosely by means of spherical-faced nuts, so as to produce a universal joint, the slot in the lever also being made long enough to keep the shank of the knife R from binding in its bearings during its vertical reciprocation.

S' is a sheave which guides the wire as it leaves the dies, so as to preserve its proper alignment with them notwithstanding the oblique direction it afterward takes while being wound on the spool. The guiding-flanges $s'$ of this sheave are indented, (see Fig. 1,) so as to leave room for the barb. The depressed part of the groove $c^2$ in the die C acts to hold the bent middle part of the barb while the wings of the die F' coil the barb around the strand-wire. The groove $c'$, by holding the strand-wire, also acts indirectly upon the barb in the same way during the coiling of the same. By making the depressed part of the groove $c^2$ and $f^6$ of slightly uneven depth, a slight kink will be produced in the strand-wire, which will hold the barb from slipping in any direction.

The timing of the parts in the construction illustrated is as follows: The wires being both still and in position over the die C, the die F' descends, and the knife R cuts off a barb from the barb-wire, this cutting being finished simultaneously with or at an almost imperceptible interval before the beginning of the bending of the barb by the depressed part of the groove $c^2$; then the shaft F is turned a half-revolution by the cam-groove $n$ to coil the barb around the strand-wire; then the die G' descends to clamp the barb in its final position; then both dies F' and G' are released from the positive action of their cams, and raised upward by the springs $l^2$ and $m^2$, respectively, the plunger S throwing the finished barb up out of the die C; then the die F' is turned back to its original position by the cam-groove $n$; then the strand-wire and barb-wire rollers advance the wires into position for the formation of another barb; and then the feed-rollers cease to rotate, and the die F' descends as before. Each revolution of the main shaft accomplishes the above operations and produces one finished barb attached to the strand-wire.

Having thus fully described the best embodiment of my invention known to me, what I claim as the invention itself is—

1. The grooved die C, in combination with the die F', having wings for the purpose of coiling the barb around the strand-wire, substantially as set forth.

2. The die C, having the groove $c^2$, in combination with the die F', having wings for the purpose of bending and coiling the barb, substantially as set forth.

3. The grooved die C, the die F', having wings, and the die G', all in combination, for the purpose of coiling and clamping the barb, substantially as set forth.

4. The die C, having the groove $c^2$, the die F', having wings, and the die G', all in combination, for the purpose of bending, coiling, and clamping the barb, substantially as set forth.

ANDREW J. UPHAM.

Witnesses:
    JNO. B. WHALEN,
    FRED B. TOWNSEND.